United States Patent [19]

Smith

[11] 3,862,011

[45] Jan. 21, 1975

[54] METHOD FOR QUANTITATIVELY DETERMINING ENZYME CONCENTRATIONS IN HOMOGENATES

[76] Inventor: Robert E. Smith, 4056 Peaceful Pl., Greenwood, Ind. 46142

[22] Filed: June 18, 1973

[21] Appl. No.: 371,128

Related U.S. Application Data

[62] Division of Ser. No. 172,280, Aug. 16, 1971, abandoned.

[52] U.S. Cl. ...... 195/103.5 R, 260/578, 260/584 C, 260/583 P
[51] Int. Cl. ............................................. G01n 31/14
[58] Field of Search ............................ 195/103.5 R

[56] References Cited
UNITED STATES PATENTS
3,591,459   7/1971   Haschen et al. ............. 195/103.5 R

OTHER PUBLICATIONS

Nachlas et al., Biophysic. and Biochem. Cytol., Vol. 7, p. 261–264 (1960).

Rutenberg et al., Jour. Histochemistry and Cytochemistry, Vol. 17, p. 517–526 (1969).

Nachlas et al., Archives of Biochemistry and Bio-Physics, Vol. 108, p. 266–274 (1964).

*Primary Examiner*—Alvin E. Tanenholtz
*Attorney, Agent, or Firm*—Woodard, Weikart, Emhardt & Naughton

[57] ABSTRACT

Various amino acid derivatives of 4-methoxy-2-naphthylamine are disclosed, as is a process for determining the concentrations of enzymes in homogenates through the use of a solution containing, among other compounds, said amino acid derivatives.

6 Claims, No Drawings

METHOD FOR QUANTITATIVELY DETERMINING ENZYME CONCENTRATIONS IN HOMOGENATES

This is a division, of application Ser. No. 172,280, filed Aug. 16, 1971, and now abandoned.

BACKGROUND OF THE INVENTION

1. Field of the Invention:

This invention relates to carbobenzoxydiglycyl-*l*-arginyl-4-methoxy-2-napthylamide and to a process employing 4-methoxy-2-napthlamides to determine enzyme concentrations.

2. Description of the Prior Art:

One of the principles most widely used for demonstrating the presence of hydrolytic enzymes in tissue sections and homogenates involves the two step process:

1. substrate $\xrightarrow{enzyme}$ coupling component + other products
2. coupling component + dye forming agent → dye The coupling components are aromatic hydroxy compounds or amines, usually of the naphthaline series. The dye forming agents are typically diazonium salts or other compounds which react in a similar manner with the coupling component to form a dye. The dyes formed when diazonium salts are used are azo dyes. One of the coupling components which has been used in histochemical localiaztion of enzymes is 4-methoxy-2-napthylamine which was first made by Rosenblatt, Nachlas and Seligman (*Synthesis of m-Methoxynapthylamines as Precursors for Chromogenic Substrates*, 80 Jour. Am. Chem. Soc. 2463, July 1958). It was first used histochemically for the localization of enzymes wherein only one amino acid, γ-Glutamyl, was attached. A. Rutenburg et al, *Histochemical and Ultrastructural Demonstration of γ*-Glutamyl Transpeptidase Activity, 17 Jour. Histochemistry and Cytochemistry 517, 1969.

Carbobenzoxydiglycyl-*l*-arginyl-2-napthylamine hydrochloride was prepared by Plapinger et al for the study of the enzyme trypsin. (*Synthesis of Chromogenic Arginine Derivatives as Substrates for Trypsin*, 30 Jour. of Organic Chem. 1871, June 1965). Carbobenzoxydiglycyl-*l*-arginyl-2-napthylamide as a trypsin substrate was used by Nachlas, Plapinger and Seligman, (*Role of Some Structural Features of Substrates on Trypsin Activity*, 108 Archives of Biochemistry and Biophysics 266, 1964). While this compound is desirable because of its capability of facilitating the study of trypsin-like enzymes, its slow coupling rate with certain diazonium salts and lack of strong color of the coupled compound is an awkward and unwanted drawback.

The coupling rate of 4-methoxy-2-naphthylamine with certain diazonium salts has been said to be much faster than that of 2-napthylamine. The prior art processes for determining enzyme concentrations have been based on amino acid derivatives of 2-napthylamine. (*Role of Some Structural Features of Substrates on Trypsin Activity*, supra.) Use of the 2-napthylamine coupling component presents an inconveniently slow and relatively insensitive method for determining enzyme concentrations.

There have been no amino acid derivatives of 4-methoxy-2-napthylamine used to determine the concentration of enzymes in homogenates. Rather, such derivatives have been used only histochemically for localization of enzymes; that is, they enable a viewer to see the areas of enzyme activity on a tissue sample e.g. M. Nachlas et al, *Improvement in the Histochemical Localization of Leucine Aminopeptidase with a New Substrate, L-Leucyl-4-Methoxy-2-Napthylamide*, 7 Biophysic. and Biochem. Cytol. 261, 1960.

SUMMARY OF THE INVENTION

The invention relates to carbobenzoxydiglycyl-*l*-arginyl-4-methoxy-2-napthylamide. The invention also relates to a process for determining enzyme concentrations in homogenates in which process 4-methoxy-2-napthylamides are employed. Since a certain enzyme might only be capable of hydrolyzing at a rapid rate and at a given pH one particular sequence of amino acids, many various numbers and arrangements of amino acids attached to 4-methoxy-2-napthylamine can be effective as a means for assaying wide varieties of enzymes.

The methoxy radical is critical in the analysis of enzymes in homogenates because of the more intense color of the azo dye formed. Thus the methoxylated compounds are both more sensitive and faster acting when used to colorimetrically measure the concentration of enzymes in homogenates.

DESCRIPTION OF THE PREFERRED EMBODIMENT

This invention first provides a novel amino acid derivative of the formula:

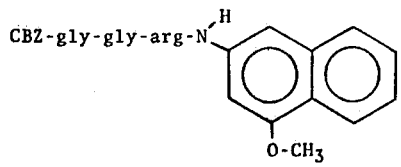

wherein CBZ-gly-gly-arg is Carbobenzoxydiglycyl-*l*-arginyl. The fact that this molecule has at least three amino acid groups is desirable because this enables the substrate to be very specific to a particular enzyme. The testing of a large variety of enzymes can be accomplished by varying the sequence and number of amino acids attached as well as by varying the pH and the amount of activators or inhibitors. In general, the more amino acids attached to the methoxylated naphthylamine, the more specific the substrate will be to a particular enzyme. The methoxy radical provides a fast coupling rate of 4-methoxy-2-naphthylamine with certain diazonium salts as well as providing an intense color and increased rate of hydrolysis.

The method for making 4-methoxy-2-napthylamine (set forth in the article by Rosenblatt, Nachlas and Seligman, supra) taken together with the method for making amino acid derivatives of 2-napthylamine (described in the article by Plapinger et al, supra), is the preferred method for making the CBZ-gly-gly-arg or various other amino acid derivatives of 4-methoxy-2-napthylamine.

This particular compound is useful in determining concentrations of trypsin and trypsin-like enzymes, the process for which is disclosed below.

The invention also provides a process for determining enzyme concentrations in homogenates. Such a determination is made by employing as a substrate, a 4-methoxy-2-naphthylamine derivative of the formula:

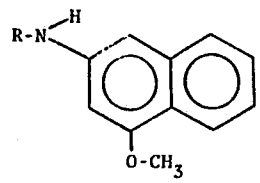

wherein R contains at least one amino acid group. A very large number of unmethoxylated compounds of this type have been used for determining enzyme concentrations, and it has been found that by adding the methoxy radical, these prior art compounds have significantly improved properties for determining enzyme concentrations in homogenates (such as serum or tissue extracts).

To the methoxylated compound a buffer is preferably added to insure that the pH is maintained at or near the optimum pH of the enzyme of interest. To aid in solubilizing the compound, propylene glycol can also be added if needed. This mixture is mixed with the homogenate containing the enzyme of interest and the enzyme is allowed to hydrolyze the compound.

After hydrolysis has continued for a time, a denaturing compound (such as hydrochloric or trichloracetic acid) is added to stop the hydrolysis. After removal of any precipitate which may form, a dye-forming agent is added to form a dye with any 4-methoxy-2-naphthylamine which is present due to enzymatic hydrolysis of the substrate.

Typical dye-forming agents are Fast Blue BBN (tetrazotized diorthoanisidine), Fast Garnet GBC (diazotized 4-o-tolyazo-o-toluidine), Fast Blue BBN (diazotized 4-amino-2, 5-diethoxybenzanilide), and hexazotized pararosanilin.

After the dye has formed, the concentration of the dye is determined photometrically by passing light of a given intensity through the dye containing mixture and measuring the intensity of the light passing through the mixture. This concentration of the enzyme is determined by comparison with a standard curve which is obtained by running similar tests on known enzyme concentrations.

PREFERRED PROCESS FOR QUANTITATIVE COLORIMETRIC

DETERMINATION OF ENZYME CONCENTRATIONS IN HOMOGENATES

A. The incubation mixture is prepared by adding 1.5 ml. of a substrate-buffer of one of the types listed below and 0.3 ml. of tissue preparation or serum to 1.2 ml. of .85 N saline in a test tube.

B. The tubes are capped and incubated for 2 hours at 37°C. in a water bath.

C. After incubation the caps are removed and the enzyme reaction is stopped by the addition of 0.5 ml. of 10 per cent trichloracetic acid and the precipitate removed by centrifugation.

D. 1.0 ml. of a 1 mg./ml. aqueous solution of Fast Blue B is added to each tube.

E. The tubes are then vibrated for 15-30 seconds and, after 5 minutes, read spectrophotometrically at 520 m$\mu$ against a blank. The amount of 4-methoxy-2-napthylamine liberated is read from a standard curve prepared earlier from 4-methoxy-2-napthylamine in the presence of serum or tissue preparations.

Substrate-buffers which may be used in the above process are:

1. Leucyl-4-methoxy-2-napthylamide is used to determine general aminopeptidase activity. 32.3 mg. of said compound are added to 50 ml. of water and combined with an equal volume of 0.2 M phosphate buffer, pH 7.0, to form the substrate buffer solution.

2. Lysyl-alanyl-4-methoxy-2-napthylamide is used to determine dipeptidyl aminopeptidase - II (found in lysosomes of the thyroid gland cells) activity. 43.4 mg. of said compound are added to 50 ml. of water and combined with an equal volume of 0.2M sodium cacodylate buffer, pH 5.8 to form the substrate - buffer solution.

3. Prolyl-arginyl-4-methoxy-2-napthylamide is used to determine dipeptidyl aminopeptidase - I (Cathepsin C) activity. 52.0 mg. of said compound are added to 50 ml. of water and combined with an equal volume of 0.2M sodium cacodylate buffer, pH 5.5, containing 0.5 ml. 1.0M mercaptoethylamine-HCl to form the substrate - buffer solution.

4. Glycyl-prolyl-4-methoxy-2-napthylamide is used to determine dipeptidyl aminopeptidase IV activity. 43.0 mg. of said compound are added to 50 ml. of water and combined with an equal volume of 0.1M Tris - HCl buffer, pH 7.5, to form the substrate-buffer solution. (Tris is 2-Amino-2-[hydroxymethyl]-1, 3-propanediol sold by Eastman Chemicals).

5. Arginyl-arginyl-4-methoxy-2-napthylamide is used to determine dipeptidyl aminopeptidase III activity. 59.5 mg. of said compound is added to 50 ml. of water and combined with an equal volume of 0.2M Tris - HCl., pH 9.5, to form the substrate - buffer solution.

6. Carbobenzoxydiglycyl-*l*-arginyl-4-methoxy-2-naphthylamide is used to determine trypsin and trypsin-like enzymes such as Cathepsin B' and the trypsin-like enzyme found in the acrosome of sperm. For determining Cathepsin B' concentration, an amount of said amide is added to 50 ml. of water to produce a 2.0mM solution and combined with an equal volume of a 2.0mM sodium cacodylate buffer, pH 4.8 containing 2-mercaptoethanol to form the substrate - buffer solution. By changing the pH of this solution to 6.7 it can be used to determine the concentration of a trypsin-like enzyme found in the secretion granules of cells.

For determining trypsin concentration, an amount of said amide is added to 50 ml. of water to produce a 2.0mM solution and combined with an equal volume of a 0.2M Tris buffer at ph 7 to form the substrate - buffer solution. Propylene glycol can be used with the 50 ml. water to aid in the dissolving of the amide.

While particular embodiments of the invention have been described for the purpose of illustration, it should be understood that only the preferred embodiments have been shown.

The invention claimed is:

1. A method for quantitatively determining enzyme concentrations in homogenates which comprises:
   a. adding a substrate of the formula:

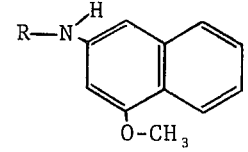

where R contains at least one amino acid group to an enzyme-containing homogenate, whereby hydrolysis of the substrate occurs;

b. after hydrolysis has continued for a time, photometrically determining the quantity of the 4-methoxy-2-naphthylamine formed by the hydrolysis;

c. adding to the hydrolyzed mixture of substrate and homogenate a dye-forming agent, whereby a dye is formed by the reaction of the dye-forming agent and the 4-methoxy-2-naphthylamine formed by the hydrolysis;

d. passing light of a given intensity through the preceding mixture; and
e. photometrically measuring the intensity of said light so that a comparison of the measured intensity with a standard curve can reveal the concentration of the enzyme originally in the homogenate.

2. The method of claim 1 in which a denaturing compound is added to the hydrolysed mixture of substrate and homogenate to stop the hydrolysis.

3. The method of claim 1 in which the substrate is carbobenzoxydiglycyl-L-arginyl-4-methoxy-2naphthylamide.

4. The method of claim 1 in which a buffer is also added to the homogenate.

5. The method of claim 2 in which a buffer is added to the homogenate.

6. The method of claim 5 in which the substrate is carbobenzoxydiglycyl-L-arginyl-4-methoxy-2-naphthylamide.

* * * * *